(12) United States Patent
Batchelder et al.

(10) Patent No.: US 8,142,633 B2
(45) Date of Patent: Mar. 27, 2012

(54) ELECTRODIALYSIS SYSTEM AND PROCESS

(75) Inventors: Bruce Batchelder, Alton Bay, NH (US); Li Zhang, Belmont, MA (US); William W. Carson, Hopkinton, MA (US)

(73) Assignee: GE Ionics, Inc., Watertown, MA (US)

( * ) Notice: Subject to any disclaimer, the term of this patent is extended or adjusted under 35 U.S.C. 154(b) by 1140 days.

(21) Appl. No.: 10/577,120

(22) PCT Filed: Oct. 27, 2004

(86) PCT No.: PCT/US2004/035705
§ 371 (c)(1),
(2), (4) Date: Mar. 8, 2007

(87) PCT Pub. No.: WO2005/044427
PCT Pub. Date: May 19, 2005

(65) Prior Publication Data
US 2007/0215474 A1    Sep. 20, 2007

(51) Int. Cl.
*B01D 61/46* (2006.01)
(52) U.S. Cl. ........ 204/524; 204/527; 204/530; 204/533; 204/536; 204/540; 204/541; 204/632
(58) Field of Classification Search ............... 204/524, 204/527, 530, 533, 536, 540, 541, 632
See application file for complete search history.

(56) References Cited

U.S. PATENT DOCUMENTS

| | | | |
|---|---|---|---|
| 3,405,047 A | 10/1968 | Chen et al. | |
| 4,925,541 A | 5/1990 | Giuffrida et al. | |
| 5,736,023 A * | 4/1998 | Gallagher et al. | ............ 204/524 |
| 6,017,433 A | 1/2000 | Mani | |

FOREIGN PATENT DOCUMENTS

JP    51-051548 A    5/1976

OTHER PUBLICATIONS

International Search Report issued in connection with corresponding PCT Application No. PCT/US04/35705 on Mar. 9, 2005.

* cited by examiner

*Primary Examiner* — Arun S Phasge
(74) *Attorney, Agent, or Firm* — Wegman, Hessler & Vanderburg

(57) ABSTRACT

A treatment system and method for continuous deionization of a biologically derived feed stream includes a plurality of electrodialysis units (3, 9, 10, 11, 12, 13) arranged in stages along a treatment line, and stages are controlled such that the feed stream attains a certain quality before entering the next stage. The feed and concentrate streams move in generally opposite sense along the line, matching fluid characteristics of dilute and concentrate cells. The treatment line has two or more stages. Systems may have phased staging operations, and cell constructions may adapt the electrodialysis units for enhanced processing of difficult process fluids. A controller sets operating potentials in different electrical stages, and simple control parameters optimize ion removal and current efficiency without polarization of the fluid. The invention also includes phased staging of reversal operation, and cell constructions or fillings that adapt the treatment cells for enhanced processing.

27 Claims, 7 Drawing Sheets

ELECTRODIALYSIS SYSTEM AND PROCESS

BACKGROUND AND FIELD OF THE INVENTION

This invention pertains to improved electrodialysis (ED) apparatus, and pertains more particularly to systems and processes that utilize such apparatus to treat large volumes of liquid. Generally as used herein and in the claims appended hereto, unless the context implies otherwise, the terms electrodialysis or ED shall be understood to be generic, and shall refer to devices for demineralizing, or for removal of components from, a fluid, wherein device units have alternating dilute and concentrate cells defined between sets of ion exchange membranes. These devices treat fluid passing through the dilute cells by transferring components thereof into another fluid present in the concentrate cells. Thus, the term will include various forms of electrodialysis having unfilled inter-membranes spaces or cells—i.e., shall include classical electrodialysis (ED), electrodialysis reversal (EDR); and shall also include filled-cell electrodialysis (now commonly called electrodeionization, EDI, continuous electrodeionization or CDI), and filled cell reversing electrodialysis (EDIR). Of these, unfilled ED gained widespread commercial application at an historically earlier period, and both ED and EDR variants remain principal treatment modalities among electrically-mediated membrane-based ion exchange processes in several large-scale industrial treatment applications such as dairy, fruit juice and plant syrup treatment applications. EDI and EDIR, which rely on intrinsic water splitting to continuously regenerate a packing of exchange resin in the dilute cells, have had more limited application, most prominently in the area of water purification where their susceptibility to fouling or scaling can be controlled by any of several established pretreatment regimens for the feed stock.

Electrodialysis apparatus having unfilled cells defined by a multiplicity of alternating anion selective and cation selective membranes was apparently first historically described by K. Meyer and W. Strauss in 1940 (Helv. Chim. Acta 23 (1940) 795-800). The membranes used in this early ED apparatus were poorly ion selective. The discovery of ion exchange ("IX") membranes (e.g., as described in U.S. Reissue Pat. RE 24,865), particularly synthetic polymer membranes which had high ion permselectivity, low electrical resistance and excellent stability, led rapidly to the invention of ED systems using such membranes (e.g., as described in U.S. Pat. No. 2,636,852) and to the growth of industries that exploit such apparatus, for example, to desalt brackish water, concentrate sea water, de-ash cheese whey, and to concentrate or otherwise treat modified starch or sugar streams, or more generally, treat aqueous streams and refinery, fermentation or agricultural fluids. During the last forty years approximately five thousand ED plants have been installed on a world-wide basis.

The utility of electrodialysis, both filled and unfilled varieties, continues to be limited to some extent, however, by technical factors, particularly its relatively low limiting current densities and its limited ability to remove poorly ionized substances. These limitations and deficiencies of prior art ED systems are discussed further below.

A. Limiting Current Density:

The IX resins and membranes used in ED are highly selective to ions of one sign or the other. A substantial fraction of the ions passing through the membranes must reach the membrane walls by diffusion from the ambient solution across a thin laminar flow layer that develops along the interfaces between the membranes and the adjacent solution that is being depleted of ions (the "dilute" or "diluting" solution or stream, as it is known in the art). The maximum rate of diffusion of ions through the diluting solution occurs when the concentration of electrolyte at such membrane interfaces is essentially zero. The current density corresponding to such zero concentration at a membrane interface is referred to in the art as the limiting current density. To increase the limiting current density it is necessary to increase the rate of ion diffusion. This may be accomplished by reducing the thickness of the laminar flow layers—for example, by changing some fluid-dynamic parameter—by flowing the ambient solution more rapidly past the membrane surfaces, and/or by using a turbulence promoter, and/or by increasing the temperature of the fluid. The latter approach is especially useful for plant (e.g., botannical) syrups whose viscosity, hence laminar layer behavior, may be highly temperature dependent, but it is further limited by the limited ability of ion exchange resins to withstand higher temperatures without impairment of their exchange functionality. Practical limiting current densities are generally in the range of 5,000 to 10,000 amperes per square meter for each kilogram-equivalent of salts per cubic meter of solution (e.g., 0.5 to 1 amperes per square centimeter for each gram-equivalent of salts per liter). A typical brackish water has a concentration of salts of about 0.05 kg-eq/m$^3$ (e.g., about 0.05-eq/l or about 3000 parts per million ("ppm")), and therefore has a limiting current density in the range of about 250 to 500 amperes per m$^2$ (0.025 to 0.05 amperes per cm$^2$). In many food industry applications, the salt concentration may be modified to suit a processing requirement, but often the added salt must be removed in a subsequent step, since the salt concentration is to be, in any case, quite low in the final stage or stages of product treatment.

Other factors being equal, it would be desirable to operate at the highest possible current density in order to maximize the utilization of the ED apparatus. However, as the limiting current density is approached, it is found that water is dissociated (i.e., "split") into hydrogen ions and hydroxide ions at the interfaces between the (conventional) anion exchange ("AX") membranes and the diluting streams. The hydrogen ions pass into the diluting streams while the hydroxide ions pass through the AX membranes and into the adjacent concentrate channels that carry a separate solution stream (the "concentrate", "concentrated", "concentrating" or "brine" solution or stream, as it is known in the art) that is thereby enriched in ions. Because brackish water may often contain polyvalent metal compounds such as calcium bicarbonate which precipitates at high pH, there is also a tendency for calcium carbonate to precipitate at those surfaces of the AX membranes that are in contact with the concentrating streams. Thus, operation at high limiting current densities results in increased membrane scaling.

This problem has been addressed by a number of techniques, for example, by chemical or ion exchange (IX) softening of the feed water or the concentrating stream; by decarbonation; by adding acid or antiscalant to the feed water or the concentrating stream (with or without decarbonation); by nanofiltration ("NF"); by arranging the dilute and concentrate paths to avoid simultaneously presenting scaling ions and scaling conditions at the same locus; by various cleaning cycles; and by regularly reversing the direction of passage of the electric current and changing the concentrating streams to diluting streams (and the diluting streams to concentrating streams) to drive out scaling species before irreversible deposition can occur, among other approaches. See, e.g., U.S. Pat. Nos. 2,863,813 and 4,381,232.

Of the above techniques, one useful process of general applicability has been the last-mentioned process, namely reversing the electric current, which is referred to in the art as "electrodialysis reversal" ("EDR").

The theory of limiting current in ED shows that in the case of sodium chloride solution, for example, the cation exchange ("CX") membranes should reach their limiting current density at values which are about ⅔ that of the anion exchange ("AX") membranes. Careful measurements have shown that such is indeed the case. However, as the limiting current density of (conventional) CX membranes is approached or exceeded, it is found that water is not split into hydroxide ions and hydrogen ions at the interfaces between such CX membranes and the diluting streams. This difference in behavior relative to the water splitting phenomenon of (conventional) AX and CX membranes at their respective limiting currents has been explained in recent years as being due to catalysis of water splitting by weakly basic amines in the AX membranes. AX membranes which have only quaternary ammonium anion exchange groups (and no weakly basic groups) initially do not significantly split water as their limiting current is approached. Such good behavior continues for only several hours, however, after which period water splitting begins and increases with time. It is found that the AX membranes then contain some weakly basic groups that have resulted from hydrolysis of quaternary ammonium groups. It has been concluded that splitting of water at conventional AX membranes at or near their limiting current densities is an unfortunate phenomenon that, for practical purposes, is unavoidable.

The existence of limiting current in ED also means that in dilute solutions the limiting current densities are relatively very low. For example, at a concentration of salts of about 0.005 kg-eq/m$^3$ (that is about 0.005 g-eq/l or about 300 ppm, a concentration typical of drinking water), the limiting current density is in the range of from about 25 to 50 amperes per m$^2$ (0.0025 to 0.005 amperes per cm$^2$), i.e., the transfer of salts per unit area per unit time is very low (e.g., 50 to 100 grams of salt per hour per square meter). This problem seems first to have been addressed by W. Walters et al. in 1955 (Ind. Eng. Chem. 47 (1955) 61-67) by filling the diluting stream compartments in an ED stack (i.e., an ED apparatus configured as a plurality of flow cells defined by a series of AX and CX membranes) with a mixture of strong base and strong acid ion exchange (IX) granules. The granules or "beads" greatly increase the effective ion exchange surface area in the dilute cells, provide good conductivity between membranes, and provide ion conduction paths across the flow, so that a high degree of demineralization may be achieved during a shorter pass and/or at higher flow velocity. Moreover, a great variety of such beads as well as materials having other conductive, absorptive, exchange or other treatment properties may be employed in the dilute cells. Since 1955, many patents have issued for this technology, among them U.S. Pat. Nos. 3,149,061; 3,291,713; 4,632,745; 5,026,465; 5,066,375; 5,120,416; and 5,203,976. The foregoing patents are hereby incorporated herein by reference.

Two modes of operation using such filled-cell ED (that is, electrodeionization or EDI) have been identified. In the first mode, the exchange (IX) beads serve as extensions of the membrane surface area, thereby greatly increasing the limiting current density. In the second mode, a current density is applied which is very much greater than the limiting current density even with the presence of the IX material. Under these circumstances, the rate of water splitting at membrane-diluting stream interfaces is very high, and the IX granules may then, for example, be predominantly in the strong base and strong acid forms, respectively. The apparatus in this mode is therefore best described as operating as a continuously electrolytically regenerated (mixed bed) ion exchange. An intermediate mode may also be identified in which there is some water splitting but the IX granules are not predominantly in their respective base and acid forms.

Most filled-cell ED (that is, EDI) systems operate in both modes. The modes may occur, e.g., (1) in the same ED cell, operating in the first mode near the entrance to the cell and in the second mode near the exit; (2) in different cells that are placed in flow series between a single pair of electrodes; or, (3) in the cells of separate stacks in flow series (but where each stack possesses its own pair of electrodes). Such different operation may result from the changing conductivity of the fluid as it loses electrolytes traveling along the flow path, or may result from the conscious arrangement of exchange material, cell geometry and operating parameters to achieve this effect.

The economics and the removal capabilities of EDI are quite good, and these systems are used to replace reverse osmosis or conventional, chemically regenerated IX systems, for example, to replace an acid CX column followed by a basic AX column or, at least in part, a mixed bed IX column. A continuously electrically regenerated EDI unit may be filled with less than a cubic foot of exchange resin, replacing an ion exchange bed many times that size and substantially eliminating the costs of periodic resin bed regeneration. However, ion exchange beds and EDI systems are not equivalent in their operational requirements, and each has its own characteristics. When using ion exchange beds (or bottles), the CX and AX granules are periodically chemically regenerated separately from each other, e.g., with aqueous acidic solutions of sulfuric acid or hydrochloric acid, and with aqueous basic solutions of sodium hydroxide, respectively. Precipitates of calcium carbonate, calcium sulfate and magnesium hydroxide are thereby not obtained. When using ion exchange bead columns, the columns of fine granules are also effective filters for colloidal matter, and the trapped material may be rinsed off the granules during their periodic chemical regeneration.

By contrast, in the case of EDI, any calcium or polyvalent metals, bicarbonate and/or sulfate removed from the diluting stream may occur in a higher concentration in the concentrating stream, particularly when the system is operated to achieve high recovery of the diluting stream (which is the usual case when the diluting stream is the intended product, and particularly when it is a high-value product). Elevated concentrations of these species may result in precipitation in the concentrating stream. Furthermore, while it is technically possible to back-wash the IX granules in an EDI apparatus, back washing is generally technically difficult or quite inefficient owing to the confining dimensions of the flow cells in which the exchange beads are packed and to the many small port structures and bead traps generally present in these devices. All of these factors make it problematic to remove any colloidal matter that may accumulate or become trapped in the filled cells.

For many applications, these problems with EDI may be addressed by providing suitable pretreatment processes for the feed fluid itself, for example: (1) regenerable cation exchange for softening followed by regenerable anion exchange absorbents for colloid removal and/or bicarbonate removal; (2) ultrafiltration or microfiltration for colloid removal followed by EDR for softening and partial demineralization; or, (3) ultrafiltration or microfiltration for colloid removal followed by nanofiltration for softening, or by reverse osmosis for softening and partial demineralization.

However, for applications in the food industry, such problems may be more complex. Food syrups may be intrinsically more prone to fouling, and the effective use of ED and its variants for applications such as de-bittering, de-acidification of fluids or precipitation of protein solids may require extremely well controlled process conditions. Protein and other components of alimentary process fluids may be sensitive to the electrochemical conditions prevailing within an EDI stack, and are potentially fouling (for anion resins in particular). Also, the viscosity and temperature requirements of a food process will affect the practically achievable flow and treatment conditions in an EDI or EDI unit. However, the resin and membrane industries have successfully engineered dozens if not hundreds of compatible exchange resins for the food industry where the great prevalence of ion exchange beds and ED still occupy over ninety percent of the treatment market. The range of already-established resins for each product among the strong and weak exchange resins, gel, macroreticular or macroporous bead substrates, high-temperature, specialty resins, adsorbents and other media for fluid treatment thus present a range of ready-made building blocks for applying and improving filled-cell EDI applications.

B. Removal of Poorly Ionized Substances:

ED (including EDR) is used in many food industry plants for alimentary applications, and the range of such applications is increasing, having branched out from predominantly whey processing applications to the processing of fruit juices, modified starch or sugar syrups and separation or refinement of grain slurries, by-product and partially-processed food product streams, as well as fermentation products and specialty chemicals (the latter areas being exemplified, for example, by products such as L-lactic acid from fermentation processes). These ED treatments may allow unexpected efficiencies, such as the return of concentrate salts to an earlier stage to maintain stable culture conditions, the recovery of product "biologicals" that have passed conventional filtration stages, removal of regulated components from a waste stream, or other advantages that increase yield, diminish waste or disposal costs, or otherwise add value to the ED separation process.

However, alimentary process applications present special problems. The treated fluid may be both viscous and complex, involving protein or other components. When one considers, for example, the use of ED to de-ash ("sweeten" or "de-bitter") cheese whey, generally the natural whey is first concentrated to the range of 20 to 25 percent solids by weight. During ED (or EDR) of such concentrated whey, the current density (that is, the rate of removal of ash per unit area of membrane per unit time) remains relatively high until about fifty to sixty percent of the ash is removed. The remaining ash behaves as if it is poorly ionized, perhaps becoming associated or complexed at lower concentration or shifted pH with protein in the whey. A principal market for de-ashed whey requires ninety percent or higher de-ashing. To de-ash from about forty percent ash down to a ten percent ash level using ED may require much more apparatus contact time than to de-ash from one hundred percent to forty percent ash. This problem may be addressed by the more or less continuous addition of acid to the whey during the later stage de-ashing from forty down to ten percent ash, the acid apparently freeing the ash from the protein. However, the added acid is itself rapidly removed by electrodialysis, introducing a certain inefficiency of operation and requiring elevated doses of acid. An undesirably high quantity of acid is therefore required to complete this process. The problem has also been addressed by removing about the first sixty percent of the whey ash by electrodialysis and applying a different process, such as ion exchange, to remove most of the remaining forty percent. Generally a column of strong acid CX beads followed by a column of weak base AX beads is employed for that purpose. However, considerable quantities of acid and base are then required to regenerate the exchange beads, introducing both direct and environmental costs. The use of specialized ED or other treatment units having cells that are constructed with bipolar membranes which operate to generate acid has also been proposed to address the problem. However, because a relatively large range of concentrations and fairly complex interactions are involved, it remains a lengthy research undertaking to identify a set of processes and operating points that will improve the performance or economics of a given alimentary fluid process.

It would therefore be desirable to mitigate one or more of the above limitations and deficiencies of conventional electrodialysis systems in treating food or similar process fluids.

It would especially be desirable to provide a electrodialysis system architecture that can robustly treat a complex feed stream.

SUMMARY OF THE INVENTION

One or more of the foregoing problems or limitations are addressed in accordance with one aspect of the present invention, by a treatment or deionization system for alimentary or similar fluids, such as a whey or plant syrup demineralization system, wherein an arrangement of plural electrically operated membrane separation units, including electrodialysis (ED), reversing electrodialysis (EDR), filled cell electrodialysis (EDI), and/or filled cell reversing electrodialysis (EDIR) units operate to demineralize a feed stream and to transfer minerals or other components of the feed into one or more concentrate streams. The processing units, each having one or more inlets and outlets, are arranged in groupings of one or more units in an order corresponding generally to the direction of the bulk movement of the feed fluid which is to be treated, and the groups form process-related stages with two or more stages in a treatment line configured such that the concentrate stream or streams proceed from one stage to the next in a sense or order substantially opposite to that of the feed/product stream. Thus, as the feed is becoming demineralized, it passes progressively to units utilizing the earlier, less mineralized portions of the concentrate stream. With this architecture, advantageously, as the feed is treated its conductivity may drop, while as the concentrate acquires impurities from the feed its conductivity may rise, so that the mineral burden and the electrical conductivity of the feed and concentrate streams are more closely "matched" as the streams pass through each unit along the treatment line. Arranging the two fluid flows in opposite sense results in an improved match of electrical conductivity of the feed and concentrate in a processing unit, which reduces the incidence of extreme voltage disparities in the electrodialysis cells, and may also result in a closer match of the mineral burdens that reduces concentration gradients across the membranes of the processing units and thus lowers back-diffusion of certain components. Conductivity matching avoids such adverse conditions as polarization and excessive water splitting, so that control of the fluid treatment to desired set points at each stage is more readily achieved, and a common cause of scaling or fouling is eliminated.

In a treatment line having plural stages arranged in accordance with the present invention, different stages may be run with different electrical operating parameters. Alternatively, or in addition, different stages may employ different types of ED units. One system may include, e.g., unfilled ED units in one stage and EDI units in a later stage. Another embodiment of a system may be implemented entirely with (unfilled) ED treatment units, but with one stage having membranes that offer distinctly different permeability characteristics or selectivity than another stage. Operation of the system for a particular feed liquid is set by adjusting the operation of different units—for example, setting the volts per cell pair in each electrical stage—to tailor the ion removal and current efficiency in accordance with the type of unit and the fluid quality/composition prevailing in that stage, or the load or conductivity along the process line. This is done to enhance overall operation, e.g., increase process efficiency or throughput, while avoiding problems that often arise during treatment. For example, one may operate substantially everywhere below polarization, and may control to a high current level in one or more early stages along the feed conduit, yet suffer little power loss through the flow manifolds. Moreover, the different stages may operate with different but changing control regimens. For example, a first ED stage may be controlled to present a certain quality of partially-treated feed at the transition between the ED stage and an EDI stage, such that each stage avoids protein fouling, denaturing or charring, or complications that would otherwise arise in a biological fluid electrodeionization system. The process line may also be controlled to optimize throughput in other ways, for example to maximize the amount of fluid treated consistent with achieving a target level of product quality, or to enhance the removal or recovery of a specific component by altering treatment parameters in one stage that primarily affects the quality, separation or recovery of that specific component.

Systems of the invention may arrange the feed stream for bulk flow along a conduit or channel forming the treatment line, and may employ pumps or valves to divert or circulate fluid from the line into the processing units of an adjacent stage and back into the conduit or channel. Pressure level, flow rate or other parameters affecting the overall residence or treatment time in a stage, or the number of recirculations through a stage, may be varied, and the system may operate using feed and bleed control techniques to achieve desired conductivity of the concentrate and dilute streams.

In one embodiment, fluid to be treated flows under pressure into dilute cells in a first electrical stage and is partially demineralized in one or more hydraulic passes in that stage. Charged chemical species that are removed in this stage are separated from the feed by the influence of a DC electric field, and transferred through ion permeable membranes bounding the dilute cells, into concentrate cells whence they are removed by a flow of concentrate. The partially demineralized fluid from the dilute cells flows to the next stage, where electrical parameters may be separately controlled for further demineralization. In various specific alimentary applications, treatment may be applied to purify the feed stream as an intended product, to extract material into a concentrate stream as an intended product or by-product, or both. Thus, concentrate leaving the first electrical stage may flow to waste, may constitute a desired product or by-product, or may be utilized in another or related process. As described above, in accordance with a principal aspect of the present invention, the conductivity of this concentrate has already been elevated by minerals removed from the feed stream in a later stage, so that a relatively low potential may be applied across the first stage while achieving at least one and preferable more than one of the operating properties of i) achieving high ion current, hence mineral removal rate;
 ii) avoiding excessive polarization;
 iii) avoiding power loss through the concentrate stream manifold; and
 iv) maintaining stable potential across the cells of the stage, and, more generally, achieving improved operating control along the treatment line as a whole.

A control system may adjust the electrical drive parameters or feed flow between the units and a feed conduit to maintain a predefined condition or feed quality at the stage. The applied voltage per cell pair may be set to reduce or minimize power losses through the concentrate manifold. A system of the invention may have its electrode potentials operate at the highest volts per cell pair that is sustainable for that stage without polarization. The potentials may be locally set in a unit or stage as a function of the conductivity of the dilute flow, the conductivity of the concentrate flow, and/or the flow rate through that stage.

Thus, for a given feed material, a method or system of the invention may include the steps of arranging a feed conduit running in a first sense, providing a plurality of ED units arranged in successive stages along the feed conduit so that different stages treat feed or partially-treated feed of different quality, and defining plural sets of ED operating conditions, including at least two different operating conditions applied to different stages so as to optimize treatment in a stage or in the system as a whole. The concentrate proceeds in a sense generally opposite that of the feed flow, providing matched and highly stable operation within stages.

One or more stages may include EDR or EDIR units, and in that case a system of the invention preferably implements reversal operation by stage. That is, rather than reversal of the concentrate and dilute streams and the DC field occurring in a conventional way with each unit, or throughout the system at the same time, reversal is performed along the treatment line with phase delay that varies in a manner such that each electrical stage is reversed just as the new concentrate and dilute streams from the reversal of the prior stage are about to enter the next stage. This phasing depends upon the intrinsic capacity or internal volimes of the ED units along the treatment line, and produces a product that more continuously meets all specifications, thus increasing product yield and reducing waste. Switching is effected to advantageously avoid mixing dilute stream liquid with concentrate stream liquid, so no "off-spec" product is created or required to be discarded or recycled. The desired operation amounts to a progressive or "rolling" operation of the valves to reverse flow directions and interchange fluid streams in the stages of ED units in a phased manner.

Systems of the invention may also be arranged or operated to achieve several goals; one is to effect overall reduction of the concentrate stream volume. In cases where the concentrate stream is a desired product, this provides a product of higher concentration. In cases where the concentrate stream flows to waste, this minimizes the volume of waste produced. Several control regimens may be applied to operate in this manner. The concentration of the concentrate may be set by a control system that regulates a bleed of concentrate from, and/or varies the amount of a make-up feed of low conductivity fluid to, the concentrate stream in accordance with an output from a detector such as a conductivity meter.

When systems of the invention employ both unfilled ED cells or units, and filled EDI cells or units, the two types may be grouped in separate stages, so that the treatment line operates with one or more ED stages; and with one or more EDI stages. Sizing of the stages, setting of flow rates, and control of electrical parameters may then be carried out more flexibly, in a manner to separately avoid vulnerabilities of the particular feed material (such as charring or de-naturing of biological components) and of the treatment units (such as scaling, fouling or current shorting through concentrate manifolds).

One useful set point or stage-defining parameter in a system of the present invention is to operate such that the feed stream process line flows from unfilled ED units to filled EDI units at a point along the treatment line such that the conductivity of the partially-treated feed is at a level that permits effective current flow without introducing polarization. The series passage from empty to filled cells while the overall removal process is carried out to control conductivity level in this manner more effectively preserves polarization-vulnerable biological materials present in the feed, and enhances yield without impairing quality by permitting separate voltage levels to be dependably and effectively set for the different stages. Such systems of the invention have particular application to processing of feed streams in the biotechnology, pharmaceutical or food industries, in which the feed stream contains protein, flavor or other vulnerable component, moiety or functionality.

The ED/EDI units of a system may be constructed to have internal flow characteristics adapted to viscous flows. That is, the units may have cell dimensions or, in the case of EDI units, may have cell dimensions, screen spacers and bead packings adapted to better accommodate the intended feed material. For example, the concentrate and the dilute spacers of a unit may be configured to produce a similar pressure drop in both dilute and concentrate cells when viscosity of the concentrate and dilute streams differ from each other, or may be otherwise dimensioned or assembled so as to prevent internal flow occlusion (from bead fouling or from membrane deflection), or to assure that reversal of direction or channeling of internal flows does not occur, or to assure other desired operating condition. It is preferred, however, that at least one stage (illustratively an EDI stage) is comprised of processing units wherein the dilute and the concentrating chambers are of substantially identical dimension, and the units are or may be operated in a reversal mode.

In accordance with another and related aspect of the invention, a system as described is operated with a novel cleaning regimen that is effective in difficult alimentary applications yet is implemented with unit steps that are consistent with process hygiene and regulatory requirements. In accordance with a preferred embodiment of this aspect of the invention a system may be configured to operate in one or more stages in a periodic, but reversible, fouling or performance impairment mode. The stage may, for example, be operated in a "store and release" mode to deal with intractable species or fouling components present in the feed. During operation in accordance with this aspect of the invention, one or more components, fractions or other matter present in the feed is taken up in or on surfaces of beads, mesh or membranes within dilute cells, and this matter is released into the concentrate stream during a reversal cycle. Modified cleaning regimens, as well as thermal, chemical or other displacement mechanisms may be employed together with such reversal to enhance this process and maintain a high performance level of the treatment units of the system over time.

BRIEF DESCRIPTION OF THE DRAWINGS

These and other desirable features and advantages of the invention will be understood from the description herein, taken together with the claims and with the drawings of illustrative embodiments and representative details of operation or construction, wherein

DETAILED DESCRIPTION OF THE PREFERRED EMBODIMENTS

Figure 1:
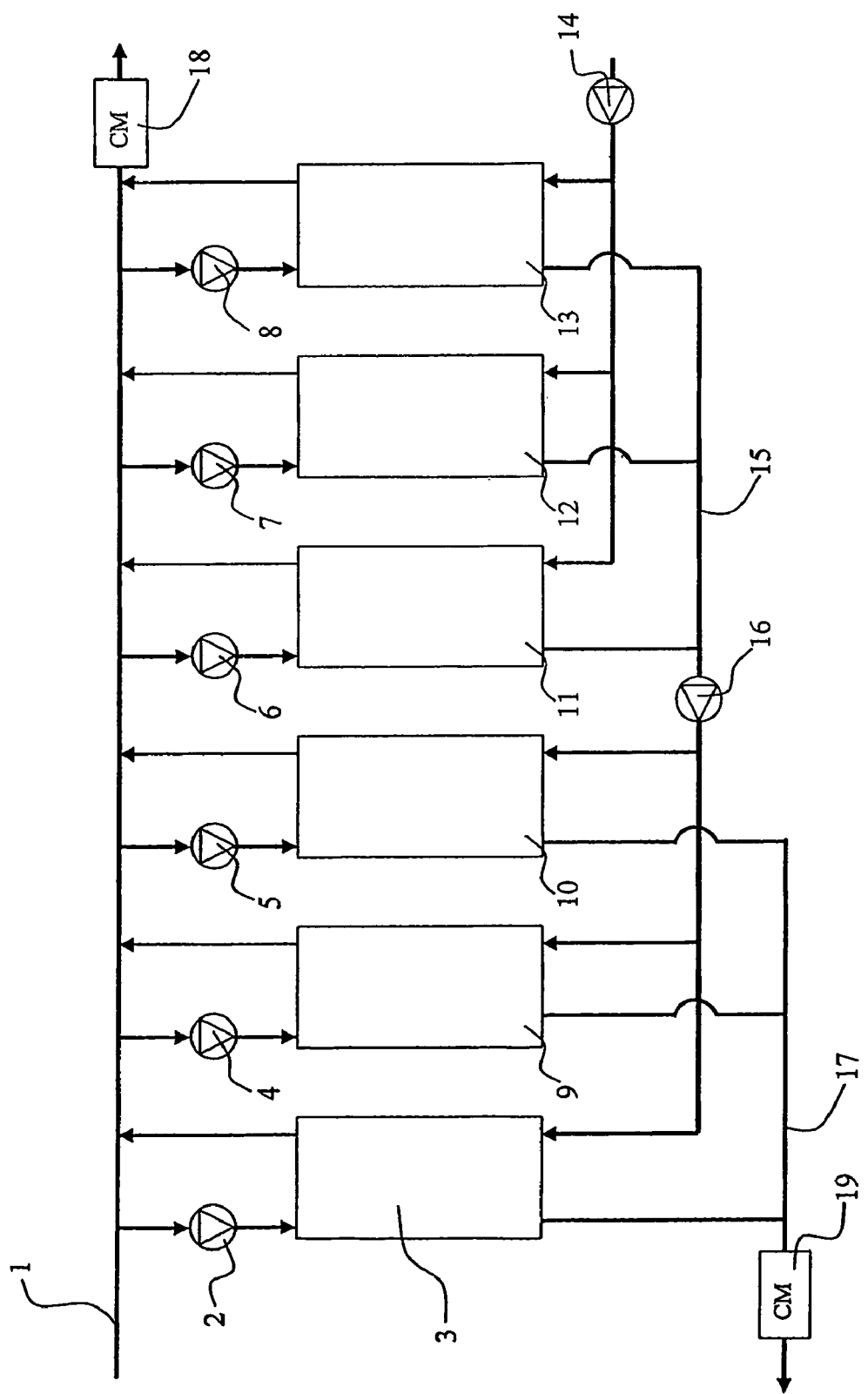
FIG. 1 depicts an embodiment of this invention in a non-reversing system.

FIG. 1 shows one embodiment of a system in accordance with the invention.

The system includes a number of demineralizing units 3, 9, 10, 11, 12 and 13, such as electrodialsis or electrodeionization units, that each receive a feed from a stream of fluid to be treated, e.g., demineralized, in a process feed line 1. The units return an at least partially demineralized flow to the process feed line, as illustrated by the flow connections at the upper end of each unit in FIG. 1. Each unit requires a flow of concentrate, which it receives via conduits and ports as shown in FIG. 1 at the lower end of each unit, to carry off the salts, small molecules or other material removed from the feed fluid The terms "upper" and "lower" here simply refer to the drawings, and imply no limitation on the geometry or orientations of the units themselves, their ports or plumbing connections, which may vary. Within each unit, dilute and concentrate flow cells are arranged to capture ions from the flow from the feed stream and to transport the ions so removed into the concentrate stream. Overall, the system is arranged as a staged system. Successive units receive the feed stream from line 1 progressively downstream along the direction of the feed flow, so that the feed each receives has been at least partially treated by preceding units that lie upstream along line 1. Concentrate movement proceeds generally in the other sense. At the downstream end, the units 11-13 along the feed line 1 receive as a concentrate input, an initial flow of concentrate, and direct their more concentrated output in the opposite direction. As a consequence, the upstream units in the feed direction receive what may be called a "downstream" (hence typically more concentrated) flow of the concentrate. In the illustrated embodiment, the downstream concentrate flow includes concentrate that has received minerals from the dilute cells of units 11-13, and is thus more concentrated than the concentrate input supplied to those units. The feed stream progresses generally from unit 3 toward unit 13, while the concentrate flow proceeds generally from unit 13 toward unit 3. Thus the overall direction of travel of the concentrate stream through the system (although not necessarily its direction within the individual treatment units 3,9-13) is opposite in sense or order to the passage of the feed stream to those units along the treatment line.

The various treatment units, or common groupings of treatment units, will be referenced herein as "stages", the term "stage" referring to a set of one or more of those units that are subject to a common set of parameters affecting electrical, fluid supply or other operating aspects of its operation. The term "electrical stage" shall be used more specifically to indicate a collection of treatment units for which the electrical operating parameters of the units, such as a voltage or operating current set point are effectively the same for all units in the stage. In FIG. 1, for example, units 3, 9 and 10 may be operated as one stage, with units 11-13 forming another stage. As discussed more fully below, each stage thus corresponds to a somewhat different quality and/or treatment of the process fluid or feed stream. Preferably these also corresponds to an adjustment of the operating factors that "tune" the treatment occurring in the stage. In accordance with the present invention, these stages are arranged along line 1 in order of generally decreasing impurity burden (and conductivity) of the feed stream and also of generally decreasing mineral content (and conductivity) of the concentrate stream. In this sense the two streams are "matched" along the length of the treatment line. While such matching is not strictly quantitative, it produces a well-defined apportionment of the electrical potential across cells, such that the operation of each unit is free of instability and the operation of each of the units 3-13 is more accurately controllable.

Advantageously, this configuration of demineralizing units in the system provides enhanced operating efficiency and may extend the range or quality of individual stages, or of the overall process.

As indicated in FIG. 1, in a first system of the invention, a feed fluid to be treated flows as a feed stream through liquid conduit 1 and at least a portion of the fluid is driven under pressure by pump 2 into dilute cells in the first unit or electrical stage 3, where it is at least partially demineralized in one or more hydraulic passes within the unit. Charged chemical species are removed in this stage and transferred under the influence of a DC electric field, through ion permeable membranes bounding dilute cells, into concentrate cells washed by a separate concentrate flow, while the partially treated feed is returned to the process line 1 and travels on. The process line 1 may be quite large and/or its contents may advance at a low flow rate, so that the first unit or stage 3 withdraws and treats only a portion of the feed at any given time, potentially recirculating the fluid several times. Similarly, each of the other stages 9-13 receives and at least partially demineralizes fluid taken from the feed stream 1, which thus becomes progressively-less mineralized by virtue of the treatment by successive units.

The units 3, 9-13 of the process line are arranged in several stages having different overall properties. A concentrate feed, illustratively driven by a pump 14, passes through concentrate cells of the three electrical stages 11, 12, 13 that reside at the downstream end of the feed conduit treatment line. This concentrate stream initially has a relatively low electrical conductivity, which may be comparable to that of the final treated product at the downstream end of process conduit 1, but the concentrate stream picks up minerals and attains a higher conductivity before the concentrate leaves the last three units or electrical stages 11, 12, 13. It next flows through a concentrate fluid return conduit 15, whence it is pumped by pump 16 as the concentrate input to the upstream or first three units or electrical stages 3, 9, and 10. In the latter stages, the concentrate picks up the ions removed from the upstream portion of the feed stream. It thus becomes more concentrated, before exiting electrical stages 3, 9, and 10 as a final concentrate through concentrate outlet conduit 17. Depending on the particular feed, treatment processes and intended product, this final concentrate may be collected as the intended product or as a useful by-product, or may be at least partially recycled to another process (such as a fermentation process or a biologics or fractional recovery process), or may be disposed of as waste.

The treatment or feed stream proceeds in the opposite sense than the concentrate flow. Fluid passes from the common feed conduit 1 into the dilute cells of unit 3, is treated therein and passes back to conduit 1, whence it proceeds (e.g., via feed pumps 4-8) into the downstream electrical stages or units 9-13, respectively, for further demineralization before being collected from, or passing out of, the treatment line along liquid conduit 1 as a treated product fluid. The flow rate of the feed to the dilute cells is regulated by a control system (not shown) which receives input from one or more product fluid quality sensors such as a conductivity meter 18, and effects various controls in response thereto to achieve the desired degree of demineralization or species removal.

Similarly, the flow rate of the fluid to the concentrate cells may also be regulated by a control system (not shown) which receives input from a concentrate sensor such as conductivity meter 19 and controls one or more parameters of operation to achieve the desired degree of concentration.

Electrical operation of the units 3, 9-13 is effected by a controller (not shown) which applies potential or driving current at a suitable level for operation with the feed and concentrate being supplied to each unit. Preferably the control is effected in common for a stage comprising a group of treatment units, rather than on a unit-by-unit basis.

The treatment line may include demineralizing units of different type. Thus, the electrical stages or units 3, 9, and 10 may have unfilled dilute cells, or may have dilute cells containing ion exchange material. Similarly, electrical stages 11, 12, and 13 may contain unfilled dilute cells, or dilute cells containing packing, e.g., of ion exchange material. The dilute and concentrate flows within an individual unit or within an electrical stage may be plumbed to flow parallel to each other in the same direction (cocurrent), in opposite senses (countercurrent), or in certain configurations, transversely to each other (crosscurrent). Countercurrent flow may be preferred in instances where the units employ relatively permeable heterogeneous membranes, or where concentration of certain species or back-diffusion from the concentrate are at issue. Cross-current flows within individual units, while no longer common in the major commercial lines of industrial flat-plate ED stacks, may be found in spiral ED units. Further, an electrical stage may have one or more hydraulic passes in series. For example when a stage is an EDI stage, it may include two EDI stacks placed in series or in parallel. When a stage is or includes an EDI stack, the stack may also be configured to contain several subsets of cells, each subset having electrodes at its ends and functioning as a complete stack. Suitable ports of the subsets may be interconnected such that the EDI stack operates as a two-stage EDI unit with fluid moving from the first subset of cells or sub-stack, into a second subset of cells or sub-stack. Alternatively, the ports of such a device may be connected such that the sub-stacks operate in parallel. A given "electrical stage" may be operated with a common set of electrical conditions for units of the stage—for example with one or a set of EDI units all operating at a common high current density, or all operating at a common lower potential and lesser current density in accordance with control data based on its position along the structured feed line 1.

Notably, the embodiment shown in FIG. 1 achieves staging by the use of two distinct levels or grades of concentrate fluid, namely an initial lower-conductivity concentrate pumped by pump 14 to units 11, 12 and 13, and the flow from line 15 which has previously been more concentrated (during its residence in and passage through units 11, 12 and 13) and is driven by pump 16 to supply units 3, 9 and 10 with the final or product concentrate via line 17. This arrangement of a higher conductivity concentrate at the upstream end of product feed stream in a multi-stage treatment line allows the units 3, 9, . . . to operate more efficiently at the higher limiting current levels possible in the upstream portion of the feed supply 1, while the higher resistivity of both product and concentrate at the downstream treatment units 11, 12, 13 provides a stable division of the electrical potential across dilute and concentrate cells that enables those units to operate effectively on the partially depleted or purified feed flow. For example, such electrical control allows the system to operate without excessive water splitting (that could otherwise occur due to mismatched fluid conductances, and which could denature essential components of the feed), and yet to optimize the process of demineralization for the ion content present in the feed at each stage along the feed line 1. This enhanced operation may be tailored to improve one or more traits of the product quality, the overall throughput and the system electrical efficiency.

Figure 2:
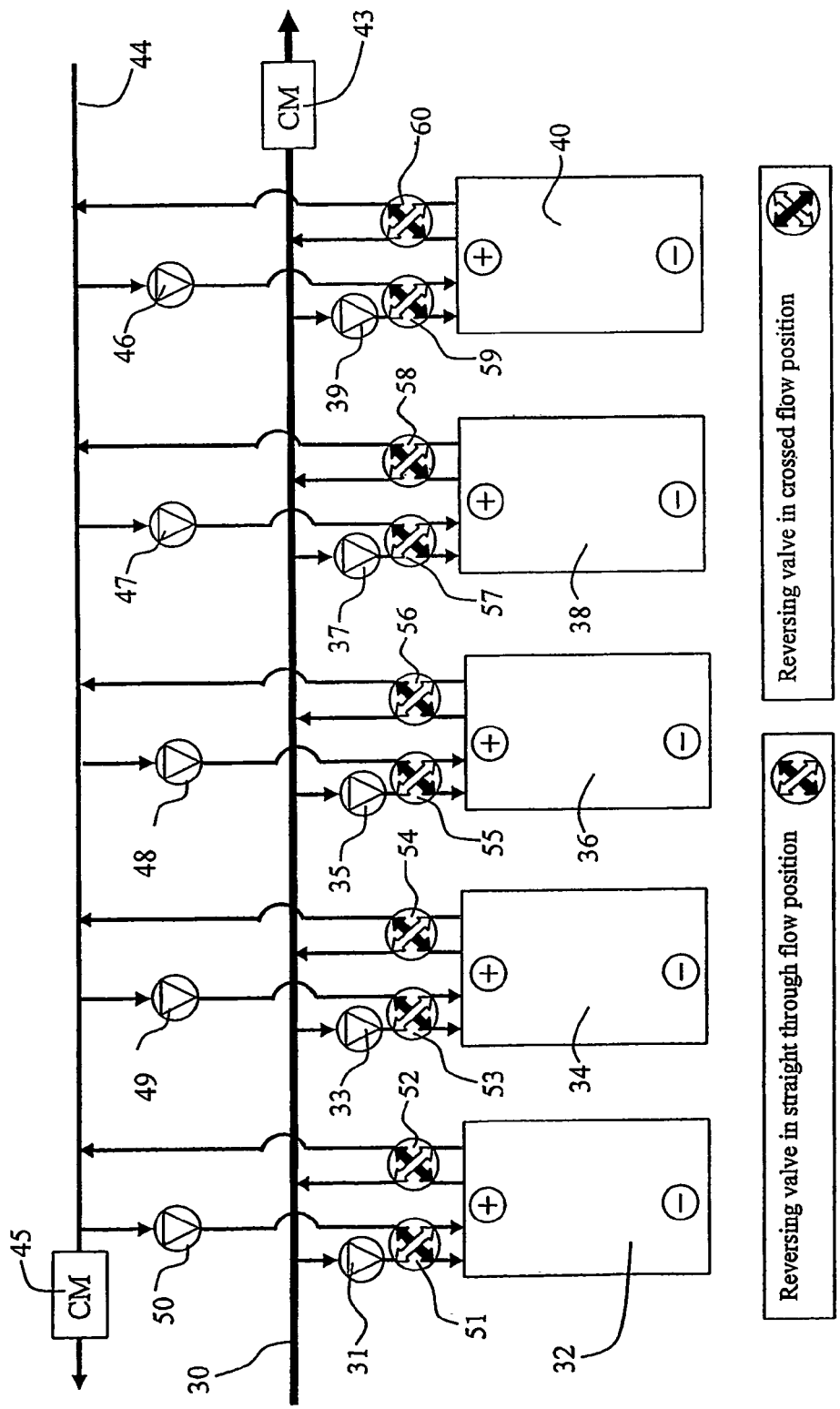
FIGS. 2A, 2B, and 2C depict an embodiment of this invention in a "feed and bleed" reversing system.
Figure 2:
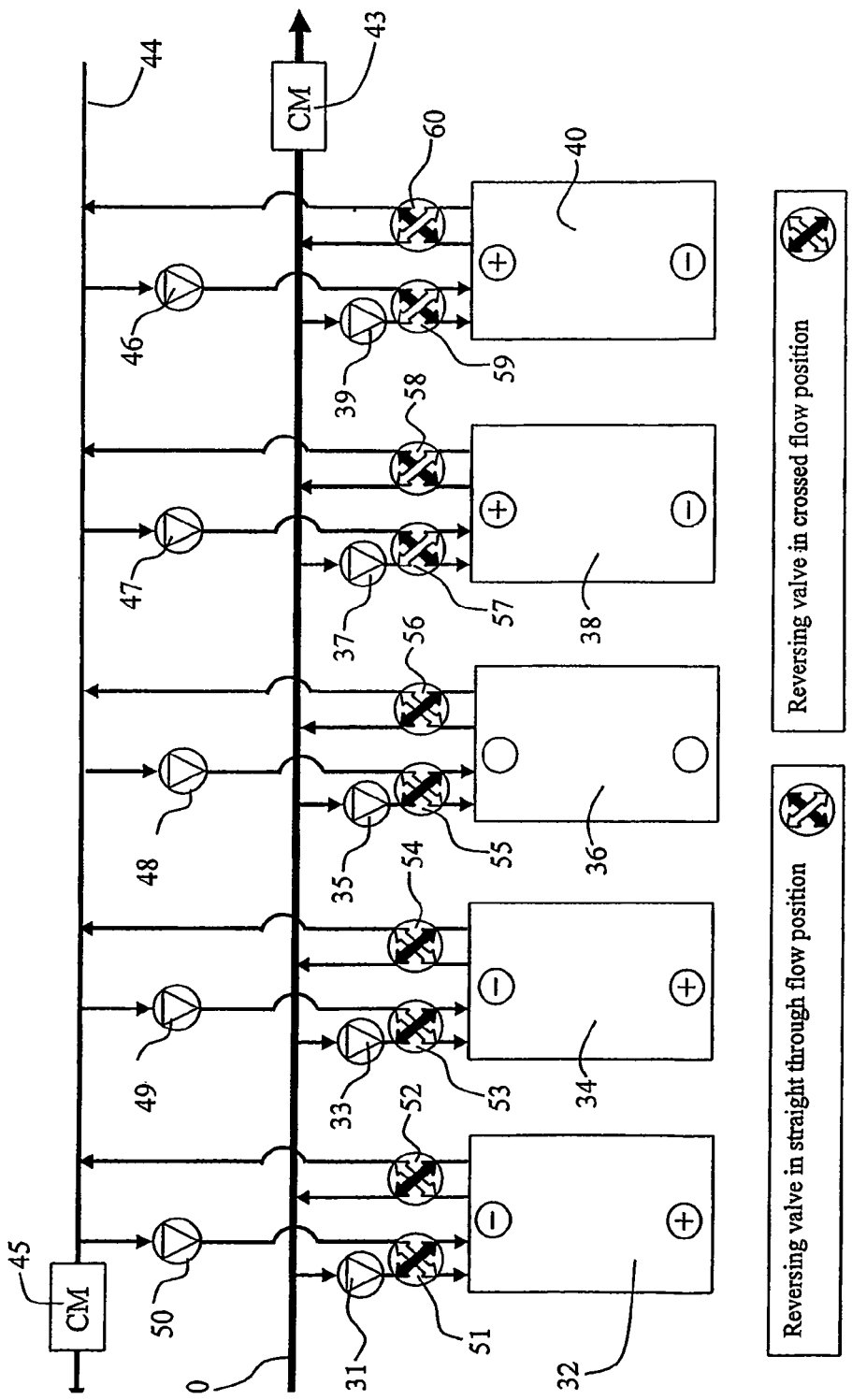
Figure 2:
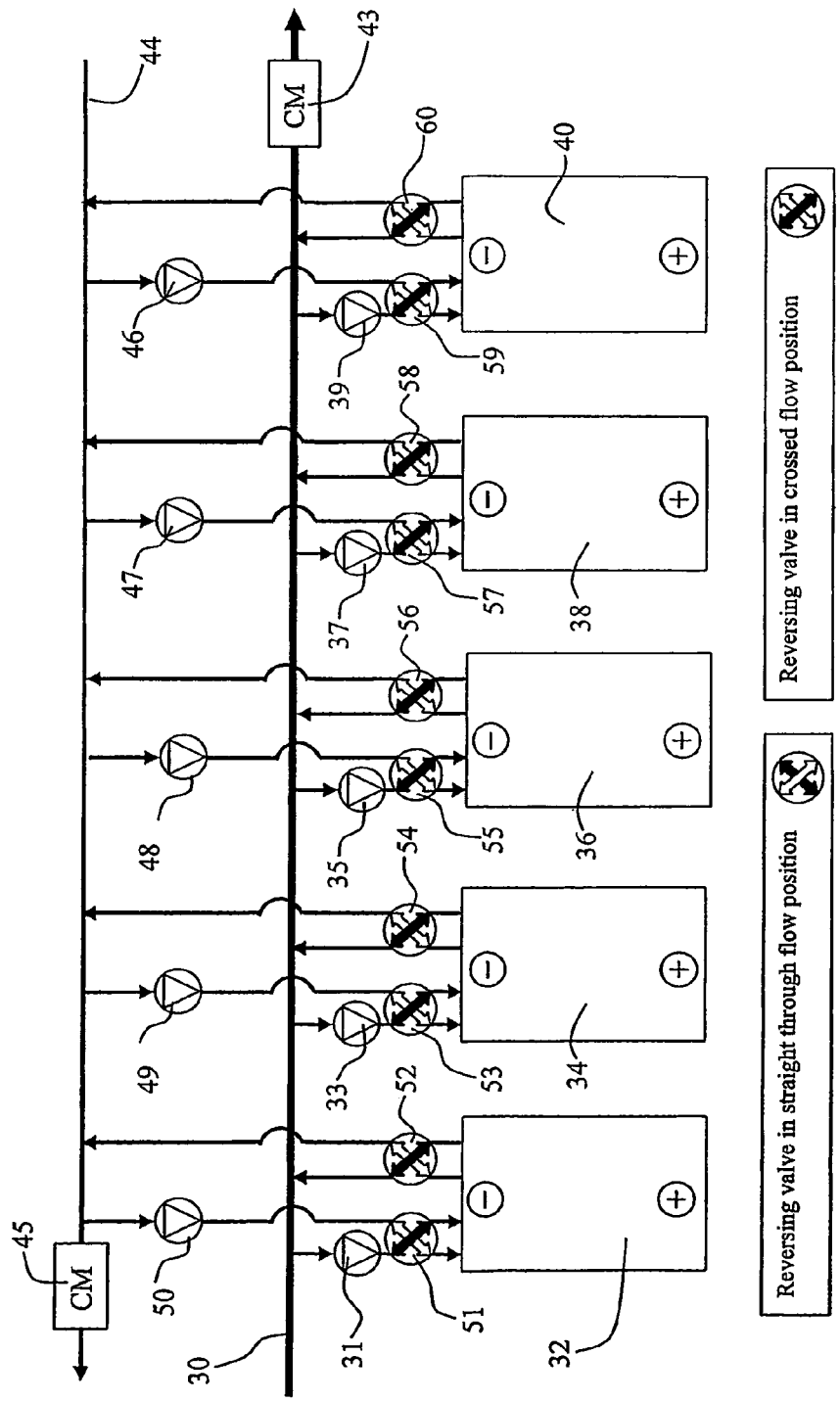

Another embodiment of the invention is shown in FIGS. 2A, B, and C. This embodiment may advantageously be embodied in a multi-stage feed stream process line employing reversing treatment units (EDR and/or EDIR), and operating in a "feed and bleed" process. In a feed and bleed configuration the rate of feed to the system is controlled to give a bleed of product at the output end that meets a specified standard, for example, that has approximately a predetermined conductivity, while the flow though each of the stages may be varied as needed, e.g., controlled to circulate through a stage one or several times, and/or at a varying pump rate so as to achieve a preset or target quality level at a given point along the line 1.

In this embodiment, the feed to the dilute cells flows through liquid feed conduit 30 and at least a portion is pumped by a first feed pump 31 through valve 51 into the first electrical stage 32. The partially demineralized stream exits the dilute cells of stage 32 and flows back through valve 51 into the fluid conduit 30. The partially-treated feed flow proceeds further along feed line 30 to downstream treatment stages 34, 36, 38, 40, and further portions of the feed are pumped downstream by pumps 33-39 through corresponding valves 52-59 into the respective electrical stages 34, 36, 38, 40 for further demineralization. At least a portion of the dilute stream exiting the fluid conduit 30 flows through a quality sensor, such as a conductivity meter 43, and may be collected as product, recycled to other processes, or disposed of as waste as the application may require. The output of the quality sensor 43 is sent to a control system (not shown) which may, for example, regulate the flow rate of the dilute feed so that the conductivity of the dilute stream exiting fluid conduit 30 is maintained at about a predetermined level. Meanwhile, a concentrate manifold or supply conduit 44 supplies concentrate to the treatment units 32-40. At the upstream end of concentrate flow, at least a portion of concentrate is pumped from the concentrate manifold 44 by pump 46 through valve 59 into concentrate cells in the last electrical stage 40. This portion becomes a partially mineralized stream, exiting the concentrate cells of stage 40 and flowing back into the concentrate fluid conduit 44, from which concentrate is successively pumped by pumps 47 through 50 into the respective electrical stages 38 through 32. In each of these stages the concentrate picks up further impurities from the feed, becoming more conductive and generally also more laden with non-ionic but small and readily-diffusing molecules. The final concentrate stream exits the first electrical stage 32; the concentrate output may be collected as product, recycled to other processes, or disposed of as waste. At least a portion of the concentrate flows past another quality sensor such as conductivity meter 45. A control system (not shown) regulates the flow rate of the concentrate feed so that the final concentrate stream is maintained at a set quality or predetermined concentration at the output of conduit 44. This predetermined concentration may be high—e.g., it may be set to the maximum obtainable value in the case where the concentrate is an intended product, or the control system may effect various actions to limit the concentration to less than the maximum. Such limitation may be imposed, for example, to prevent concentrate conductivity from producing concentrate manifold short-circuit that would otherwise limit efficiency, introduce excessive heating, damage membranes or components of the units or impair the desired operation of the dilute/concentrate cell pairs of a given stage.

In any event, however, the concentrate flow becomes more concentrated toward the feed inlet end of the treatment line, while the feed becomes progressively less mineralized as it moves toward the inlet end of the concentrate conduit at the distal end of conduit 1.

By arranging the major feed fluid flow line along successive ED stages or treatment units to be in the opposite sense of the receiving fluid flow, the overall product treatment line arrangement, which applicant calls a counterflow treatment line arrangement, more closely matches the conductance of the feed and concentrate flows in the units at each stage of the treatment line to achieve stable electrical control. This makes the transfer function for the stage (e.g., the feed input quality vs. feed output quality as a function of voltage and flow) highly stable and well defined, so that an overall treatment process control sequence may be quickly determined and in operation only relatively small adjustments will then be necessary for the dilute and concentrate controllers to run with optimum performance. It will be understood that the flow of fluid within the dilute and concentrate cells in a given stage may bear a co-current, a countercurrent or other relation to each other (such as across each other, or partly parallel, antiparallel or across each other in different segments of the flow path through each cell.

The process line with staged counterflow movement of the dilute (or "feed") and concentrate streams in accordance with the present invention may advantageously operate to reduce the loss of small uncharged organic molecules from the feed fluid. Small uncharged organic molecules transfer through the membranes by diffusion, with a diffusion rate that is a function of membrane permeability, of the rate of electro-osmotic water transfer, and of the concentration difference between the dilute and concentrate streams. The rate of electro-osmotic water transfer is a function of the amount of electric current carried by ions passing through the membranes. The concentrate stream is only slightly enriched with small organic molecules in the last stage (e.g., stage 13 of FIG. 1 or stage 40 of FIG. 2) because the current used in this stage is the lowest of any stage. As the concentrate reaches and passes through the later stages along its flow path, it acquires a progressively increased concentration of small organic molecules. This increase in the level of small molecules on the concentrate side reduces the concentration difference between dilute and concentrate streams, thereby impeding diffusive losses from the initial feed stages (3, 32), which have the highest current. The result is a reduced loss of small, uncharged organic molecules from the treated product stream (in line 1 or 30).

A preferred embodiment of the invention employs reversing stacks, namely EDR and/or EDIR treatment units, with more than one electrical stage, and operates to effect reversal of treatment units with a phase delay between stages.

In conventional reversal operation of a treatment unit, the electrical polarity of a unit is reversed, and suitable valves are operated to interchange the flow of dilute and brine streams flowing into the compartments; this changes the respective functions of the compartments. That is, the formerly diluting compartment is operated to receive a flow of concentrate and perform as a concentrate compartment, and vice-versa. Output connections may be switched at slightly different times to allow the (former) dilute flow to be pushed through by the switched brine and entirely clear the already-treated portion of flow from the cells, or may be switched so as to prevent the former brine from entering the product output or process flow line 1. Switching of the electrode polarity may also be phased in relation to switching of the input streams. For individual stacks, EDR and EDIR processes of operation are well known and constitute established technologies. The present invention provides a further "cushion" in the large process conduit that permits switching to greatly diminish the amount of lost feed, or contamination from the concentrate, necessitated by the reversal process.

The present invention applies further steps to implement reversal operation in a multi-unit process line having treatment units arranged in stages. Reversal of a unit typically results in some out-of-spec product during the reversal that will not meet specifications and must be recycled or sent to waste. For systems of the present invention employing a number of stages in hydraulic series, this potential problem or limitation is addressed when the stages are reversed, by reversing the electrical polarity and the fluid flows through the dilute and the concentrate compartments in a phased or sequential fashion as illustrated in FIGS. 2A, 2B, and 2C, coordinated with the transit of the treated or concentrate flows through or past the respective stages along the feed and concentrate conduits.

FIGS. 2A-2C illustrate phases of staged reversal operation for a system similar to that illustrated in FIG. 1 having a common feed conduit 30 extending along the length of a treatment line. A plurality of valves which for simplicity are illustrated as four-port valves 51, 52, 53, 54 . . . are provided at the inlets and outlets of the treatment units 32, 34. Illustratively, valve 51 is operative in a "straight through" setting to connect the pressure lines from feed and concentrate pumps 31, 50 to the inlets of the dilute and concentrate manifolds, respectively, (FIG. 2A) of the first unit while valve 52 interconnects the outlets of those manifolds back to the feed or concentrate lines 30, 44. Each valve is also settable in a crossed flow position to interchange the connection between its two inlets (valve 51) or outlets (valve 52) with the dilute and concentrate manifolds, so that the "dilute" cells receive and return concentrate, and the "concentrate" cells receive and demineralize the feed flow. It will be understood by those skilled in the art that the terms "dilute" or "concentrate" inlet manifold and outlet manifold as used with reference to an EDR or EDIR unit are a convenient shorthand, referring simply to the plumbing or other connections to the set of cells that were initially referred to as dilute or concentrate cells, respectively. In practice, the cell constructions for reversal operation, and optionally also the fixed manifold connections for units intended for reversal operation, are preferably substantially symmetric, and each set of cells may be operated in each of the two functional modes.

Returning now to FIGS. 2A-2C, FIG. 2A illustrates a multistage system having counterflow feed and concentrate lines 30, 44 with reversal valves 51-60 interconnecting lines 30, 44 to the corresponding ED or EDI stages 32, 34, 36, 38 and 40 for reversal operation. All valves 51-60 are shown in straight-through position. Each valve has a second position, referred to as crossed, in which the two inlet ports of the valve are each connected to the other outlet port; for example, valve 51 may connect the pressurized feed and concentrate lines to the dilute and concentrate cells, respectively, of stack 32 in a straight-through setting, and to the concentrate and dilute manifolds of stack 32 in a crossed setting. Similarly, each of the outlet valves 52-60 has a four-port, two-position operation capable of selectively connecting the dilute and concentrate outlets to either the feed and concentrate lines, or to the concentrate and feed lines. Thus, to reverse the dilute and concentrate flows to the compartments of a first stage 32, one valve may be reversed, connecting concentrate flow to (what was the) dilute side; the controller then preferably waits for a certain time or flow delay interval until product not meeting specifications is about to exit the first stage before changing the state of the other valve, e.g., valve 52, which interchanges the dilute and concentrate connections to the compartments. Electrical polarity may also be reversed at this time.

This switching point is shown in FIG. 2B for unit or stage 36, after both interchange valves 55, 56 of stage 36 have been placed in a crossed state, and the electrode polarity is reversed. The remaining downstream stages 38, 40 still remain in their original dilute/concentrate valve configurations, and the main feed conduit and concentrate line adjacent to those stages, as well as the feed and concentrate segments S, S' running between stage 36 and stage 38 contain the same quality fluids as they did before reversal of the downstream units 32, 34, 36. However, as the front of reversal-treated feed moves through segment S and approaches pump 37 and valve 67, stage 38 undergoes its reversal sequence. In a similar manner each following stage is successively reversed. FIG. 2C illustrates valve states when all stages have fully reversed.

The phased reversals are preferably achieved by adjusting the time intervals for reversal between each stage in accordance with the stack internal volume and the conduit volume between the stages, in a manner to minimize the amount of product that does not meet specifications. Such phased-in reversals may be manually or automatically implemented, but in practice manual adjustment of automatic controls is preferred The controls may follow a set point that is manually re-set and then tracked by a suitable detector, or may be changed, for example, by manual entry of a measurement such as feed fluid viscosity that affects the system transit times or treatment removal levels. In other embodiments, one or more conductivity probes, which may include probes positioned in the feed line 1, 30, may provide outputs to a control system that determines optimum reversal points, for the given system dimensions and flow data, to achieve one or more extrinsic goals, such as maintaining quality variations within a specified threshold at the outlet of a stage.

Figure 3:
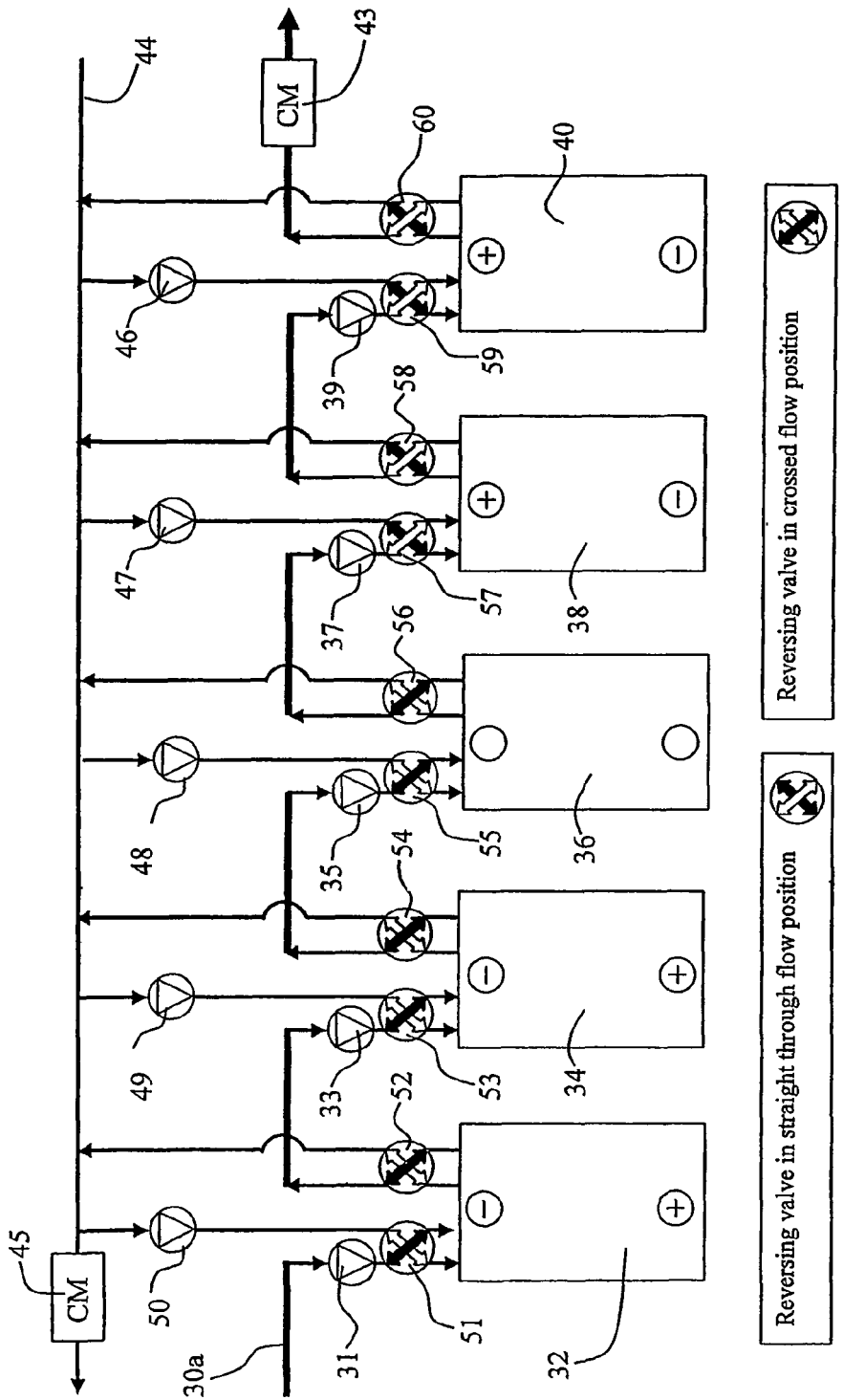
FIG. 3 depicts an embodiment of this invention with a straight through flow of the diluting stream and a "feed and bleed" concentrate as a reversing system.

Another embodiment of the invention is shown in FIG. 3. This embodiment is similar to that described for FIGS. 2A-2C, except that reversing EDR and EDIR stages are in a straight, flow-through configuration for the diluting stream, while the concentrate stream is a "feed and bleed" configuration. That is, the feed flows directly through each stage in series, rather than circulating between a stage and an adjacent feed conduit that passes each stage in series. In this case all of the flow from feed conduit 30a passes through valve 51 through dilute cells of a first stage 32, and exits through valve 52. The feed flow continues successively through each of the separate units in the remainder of the system before the final product flow exits the last stage 40 past conductivity meter 43. Thus, rather than drawing feed from a larger continuous conduit as in FIG. 1 or 2, the feed path follows discrete interconnects between the dilute outlet of each unit and the dilute inlet of the next. This not-fully symmetric construction, with a dilute or feed path following a plurality of interconnecting segments, while the concentrate proceeds along a system-long concentrate line may be used for systems employing asymmetric reversal cycles, rather than fully symmetric operating cycles usually used in prior art reversal operation. A preferred asymmetric reversal operation mode is one in which dilute cells are periodically operated as concentrate cells during a "store and release" cleaning cycle, so as to flush out or elute certain components that have accumulated on or in the membranes and/or the resin filling of the ED devices. In such operation, the salt level of the concentrate stream, which may be selectively increased by further providing a suitable salt or chemical injection system that adds a controlled additional amount of salt to the reversal fluid to advantageously assist in the breaking up and sloughing of accumulated biofilm and other matter. High salt, all or a portion of which may be provided by the existing concentrate salinity, causes wrinkling and cracking of any surface-held biofilm so it is more easily shed, and also causes shrinkage of the underlying resin, creating a more open flow path, so that backwash-clearing of the reversed cells is more effective. The arrangement of the feed line as a collection of small, separate segments assures that the matter backflushed during a reversal-cleaning mode of operation does not stagnate or remain in a large slowly-flowing conduit, but is suitably and quickly driven through the segments and flushed from the system.

In this regard, the material removed from the surfaces or eluted during this reversal of cleaning stage may also be shunted (e.g., by additional valves and pipe connections) to a backwash/cleaning tank, or to a dedicated collection vessel or system. The latter arrangement is particularly advantageous when the system is to recover, enrich and/or separate an eluted component, for example as a biological or other product, or as a component for return to an upstream process such as a fermentation process or intermediary process. When the apparatus is to carry out such enrichment or recovery by a storage and release mechanism, the EDI device may be configured with relatively thick cells, up to an inch or more, to enhance their capture capacity between purges.

In accordance with another aspect of the invention, a preferred embodiment for treating fluids where the viscosity of the dilute stream differs from the viscosity of the concentrate stream, employs units having concentrate and dilute spacers having dimensions or flow impedance specifically tailored to produce a pressure drop from inlet to outlet that is substantially the same in both the dilute and concentrate cells at the desired effective flow rates prevailing in the respective cells, as such pressure is influenced, for example by stream viscosity and or flow. Such differences in stream viscosity are commonly encountered in food industry flow treatment processes, and different dilute and concentrate flows are commonly found in most ED applications. Thus, when the concentrate flow is to be only 5 to 10% of the dilute flow, the cells of units in the system may nonetheless be sized such that differential pressure introduced between the adjacent cells does not subject the membranes to undue stress, bending deflections or cross-leakage. Generally, the flow rates may be similar or different for the two types of cells, and may be set or adjusted by suitable valves, pressurization or pumps.

Figure 4:
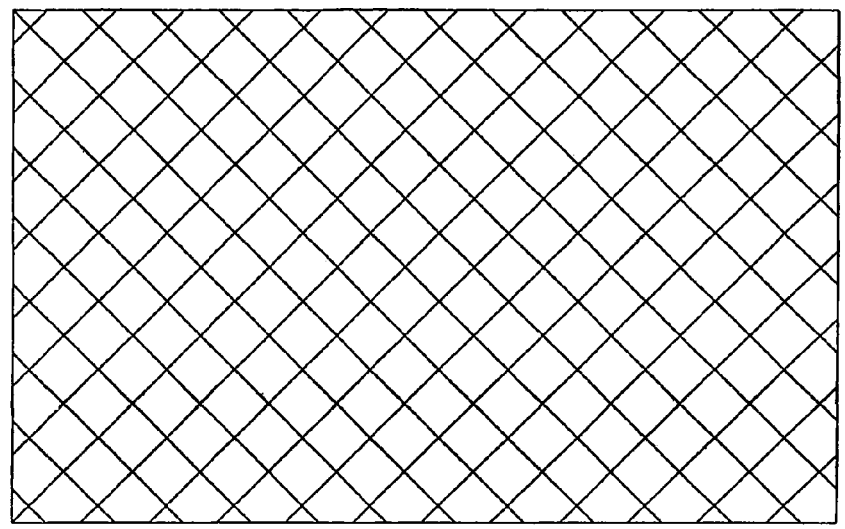
FIGS. 4A and 4B show a top view of screens with different strand spacing.
Figure 4:
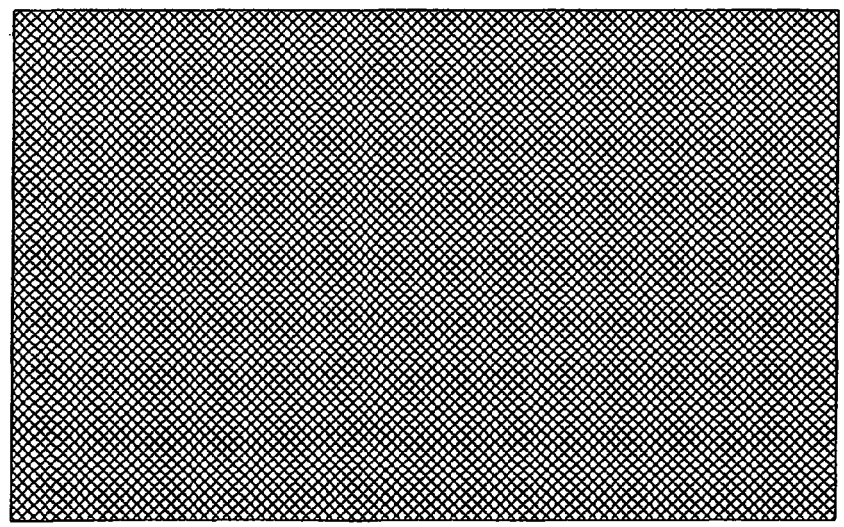
Figure 5:
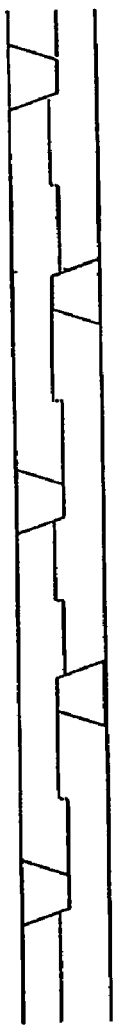
FIGS. 5A and 5B show an edge view of screens of the same overall thickness with different thickness of individual strands.
Figure 5:
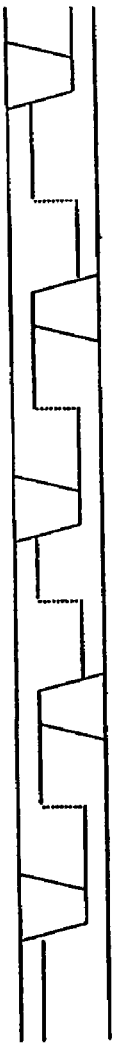

Several design parameters of the spacers may be changed, within limits, to accomplish or promote the desired minimization of differential pressure across the membranes. One suitable screen parameter which may be varied for this purpose is the cell spacer thickness. In the case of screen spacers, increasing the number of strands per unit length of the screen component may also be practiced to increase the pressure drop along the flow path through the cells. FIGS. 4A and 4B show two screens useful for this purpose, with different strand spacing, a mesh of about 2 mm and one of about 8 mm. Increasing the overall thickness of an individual strand as a percentage of the screen thickness also increases the pressure drop. FIGS. 5A and 5B show screens of the overall same thickness which have different thickness of individual strands. The screen shown in FIG. 5B is arranged to obstruct a greater portion of the cross-sectional area of the cell and will have a significantly higher pressure drop per unit length than the screen shown in FIG. 5A. Thus, an (ED or EDI) deionization unit employed at one stage of the present system may be constructed with one of the foregoing variations to optimize it for operation at a particular position in the treatment line or for treatment of a particular fluid product.

By apportioning treatment of a food syrup or biological fluid between or among different stages in accordance with the present invention, treatment is effected under stable and well controlled conditions such that the treatment units operate without irreversible fouling or degradation of performance. In addition, units such as EDI, while not conventionally employed in the food industry, can remove certain components—such as calcium and phosphate ions in lactic acid—more quickly or to a lower endpoint, and thus may advantageously be applied to one or more specific species or contaminants affecting taste or commercial quality of a feed fluid. In systems of the invention, the use of different units arranged in stages allows suitable endpoints to be specified (e.g., a conductivity, component concentration or the like) and to be dependably attained, without requiring large fixed exchange beds or incurring the environmental costs associated with bed regeneration. Moreover, within the EDI/EDIR units of a treatment stage, different specific resins may be loaded to further tailor the ED operation to the feed or to enhance the treatment process.

Thus, while a number of conventional mixed-resin EDI cell fillings originally employed for treatment of industrial water have proven effective for some alimentary treatment applications, the fillings may also be varied and adapted to specific processes. In processing alimentary fluids, especially relatively viscous fluids such as a high fructose corn syrup, the beads employed for filling electrodeionization units may be selected from among the food-compatible exchange beads that have been developed over several decades for particular industries. These include a large number of anion and cation resins, such as gel, macroporous and macroreticular resins of different types, as well as adsorbent and specialty resins which have been found useful or necessary in the industry to carry out decoloring, capture of specific contaminants, pH stabilization or the like. Within individual units or stages, one or more types of resin may be segregated in an initial front end or in a later portion of the flow path through the device (for example to adjust the pH to a more or less acidic level), or may be arranged in "zebra" or other banded patterns to achieve effective removal of both anions and cations while maintaining a generally stable pH or cell conductivity over the flow path.). The compatibility of specific resins and mixes of resin types with the electrodeionization units is readily ascertained, or may be assured by suitable adjustment of operating potentials which, as noted above, can be controlled in a highly stable manner due to the matching of feed and concentrate stream properties in the present invention.

In addition, fluid entering each stage may be further conditioned for processing in that stage. Thus a caustic or acid injection or production unit may be positioned along the feed or concentrate line to adjust the pH of fluid entering a stage, water or other diluent may be added or removed to thin out or concentrate a fluid, and conditioners or co-active ions may be added separately from the process flow at large to modify the effect of processing in a given stage.

The cation and anion exchange membranes employed in the ED and EDI devices of these systems are preferably homogeneous ion exchange membranes, such as those manufactured by Ionics, Incorporated of Watertown Mass., which are often utilized in that company's ED and EDI devices. These are preferred for their great strength, relative freedom from leaks and diffusive transfer, and their generally high quality. However, heterogeneous membranes as manufactured by many suppliers, may also be employed, with suitable process differences or equipment to accommodate their different functional and physical characteristics.

In addition to tuning the process parameters to achieve effective treatment in a number of stages having matched feed and concentrate properties, it will be necessary to clean the treatment units. One would expect the filled (EDI) units, having confined cells and resin packing that are particularly susceptible to fouling, to be particularly difficult to clean, because unlike empty-cell (ED) units that have more open flow paths, or ion exchange beds that can be cleaned in a turbulent, high-flow and unconstrained (fluidized) state, EDI devices maintain their exchange beads relatively closely packed in small confined cells through which the flow passes or is channeled through restrictive interstitial spaces of the packing.

In accordance with another aspect of the invention, applicants have found that cleaning can be effectively carried out in the constrained treatment chambers of ED units of a treatment line by using a high salt reversal cleaning. The cleaning protocol preferably applies an elevated salt concentration and pH extremes as well as flow circulation. This may be effected as a clean-in-place (CIP) operation during reversal as described above, and may include steps involving addition of caustic, acid, and/or salt in various embodiments.

In one such cleaning regimen, a CIP of the dilute cells was performed applying a salt/acid step followed by a salt/caustic step. A standard CIP regimen (as used, for. example, to periodically remove hardness species in a water treatment EDI stack) was first applied but little change was observed in the unit performance. The conventional cleaning regimen and a basic outline of procedures may be found, for example, in the operator's manual generally supplied by the manufacturer of an EDI unit, which was in this case an Ionics 150 cell pair EDI stack. It was found necessary to change that procedure.

The new regimen was next employed, altering three parameters—the low pH, the high pH and the salt concentration employed in the cleaning cycle. The amount of salt employed was increased, from 75 lbs. for each stack to 150 lbs. The specific cleaning protocol was as follows:

CIP of EDI Dilute Cells for Alimentary Process Flow (Corn Syrup)

One hundred sixty gallons of cleaning solution were prepared for circulation through the unit in a loop with a 5 micron bag filter and a cleaning fluid tank The interior volume of stack and piping constituted another 40 gallons of capacity in the circulation loop. 150 lbs. of salt were employed to produce a solution of normality 1.55 N. Recirculation was started with the water temperature at about 30° C., and salt was added—three fifty pound bags added over a 40 minute time span. Salt addition was initially effected very slowly to prevent osmotic shock of the resin. Once salt addition was complete, HCl addition was started to bring the pH down to around 1, as measured by Model 6P Myron-L hand-held meter. Actual pH was about 0.9. The solution was then run at a 20-25 psi feed pressure for 30 minutes, after which the tank was dumped, and new water added to the 160 gallon level.

Next, recirculation was restarted and an additional 150 lbs. of salt were added; the second salt addition was carried out more quickly since the resin and membranes were now already in salt form. Once the salt had been added, NaOH was manually added at moderate rate to bring the pH up close to 13, forming a caustic salt solution. The pH actually stabilized around pH 12.8, also as measured by the hand-held meter. The caustic salt solution was then recirculated for an additional 30 minutes at a temperature of about 40° C. While continuing recirculation, fresh water was added in a feed and bleed method to gradually reduce the salt concentration. The next morning, the valves were reset to normal settings and the stack was operated at first hydraulically for a few hours and them electrically to flush out the salt. The cleaning produced an increase in product flow and a drop in feed pressure. Stack resistance was lowered as well, as indicated by an increase in stack operating current (amperage).

Thus, the CIP was carried out by applying relatively high salinity, which is believed to enhance breakup of biofilm and protein adhesion through mechanisms such as shrinkage of exchange beads, and shriveling, embrittlement or other effects on the surface biofilm, as well as other mechanisms such as displacement of the hardness species retained in the resins. Shrinkage of the swollen exchange resin provides more open flow conditions during the cleaning cycle to enhance flow-scrubbing and allow the removed, displaced or dislodged material to be transported from the dilute cells. The cleaning conditions also applied relatively extreme pH conditions at both ends of the spectrum, which, in addition to de-fouling and cleaning effects, operate to sanitize the interior flow spaces of the treatment units. This is especially advantageous for treating pharmaceutical or food industry process streams, because the relatively restricted temperature range tolerated by many exchange resins, renders thermal sanitization only marginally effective, excessively slow or otherwise impractical. The arrangement of the process line in stages as described above, when an ED stage is followed by an EDI stage enables more effective cleaning.

For the CIP treatment with high salinity, the salinity may be provided, at least in part, by the concentrate stream, although it is preferable to employ an extrinsic salt source (e.g., with greater sodium content) to achieve more effective softening and removal of accumulated hardness ions during cleaning. The high salt treatment has been found to be effective for cleaning biofouling, the inclusion of long soak or recirculation steps in the cleaning protocol, as well as the carrying out of acidic and basic steps, as well as steps of applying a suitable electric potential across the cells during cleaning, each also contribute significantly to the effectiveness of the cleaning cycle and to avoiding performance drop-off, fouling or scaling over the long term.

The mechanism or reversal cleaning may also be applied as a mechanism for treatment of a feed stream to specifically target certain poorly-removed or potentially fouling components of the feed, and to separate those components by a "store and release" process. In that case, one or more relevant treatment units or stages, such as a first stage or unit, may be specifically configured to enhance the capture operation—for example by placing anion exchange resin in the upstream end of treatment cells to capture protein components. This intentional front-end biofouling captures and removes the protein/foulants ahead of the remaining portion of the packed cells and any downstream units or stages. The captured components are then released when the first stage or unit is operated in reversal mode, or may be removed in a CIP operation. Reversal valves may be provided to reverse the flow direction through the cells, in addition to the normal interchange of dilute and concentrate streams applied to the dilute and concentrate cells, so that the fouling biomaterial or other captured material (such as scaling species) is (back-) flushed directly out, without passing further into the packed cells. During such reversal cleaning, the time material flushed by the concentrate flow may be directed by suitable valves to waste, or to a separate tank, where settling, filtration and/or other steps may be applied to remove the dispersed solids from the concentrate stream if it is to be retained. Recovery of that fraction may also be effected, if recovery is required. In such a case, a system thus remove a first set of components by conventional electrodialysis processes—capture, ionic conduction and transport into the concentrate stream, and a second set of components are removed by capture and subsequent elution or direct physical release into the concentrate stream during reversal of the stage. As noted above, the second set of processes may also be effected during a modified reversal/cleaning cycle, including acid and/or caustic soak and circulation steps, in which case all or some of the fluids may be segregated from the normal concentrate supply of the treatment system or may be passed quickly to waste.

Thus, the staged systems of the invention offer new separation and treatment possibilities for difficult-to-treat feed streams, wherein highly stable lectrical operation is achieved. The feed stream itself may therefore be arranged in a sequence of graded quality that may be conditioned or adjusted at one or more stations between the inlet and the outlet of the process line. Different (ED or EDI) units may be employed to optimize separation or purification, and within the EDI treatment portions of the line, different types of EDI units may be employed such as thick cell units, thin cell units, sparsely filled, layered or banded-filling units (see, e.g., commonly owned International Application PCT/US03?28815 and the other published commonly owned international applications of applicant, the full text and disclosures of which are hereby incorporated herein by reference).

The invention being thus disclosed and illustrative embodiments described, further variations and modifications within the scope and spirit of the invention will occur to those skilled in the art, and all such variations and modifications are considered to be within the scope invention as set forth herein and defined by the claims appended hereto.

The invention claimed is:

1. A fluid treatment line for performing a continuous treatment of a flow of fluid, wherein the treatment line comprises:
a plurality of electrodialysis treatment units, said treatment units being configured for connection so as to receive a feed flow of feed fluid that is to be treated, and so as to receive a flow of concentrate fluid that is to receive material removed from the feed flow during treatment in said treatment units, each treatment unit being electrically connectable to ionically transfer said material from the flow of feed fluid into the flow of concentrate fluid;
a plurality of fluid connections interconnecting said treatment units in stages along the treatment line such that feed fluid proceeds sequentially from a first stage to one or more later stages, and concentrate fluid proceeds in an opposite sense from a later stage to one or more earlier stages of the treatment line;
said fluid treatment line further comprising at least one pump operative to control the flow of said feed fluid and said concentrate fluid through said stages, said stages further comprising a detector operative to sense a characteristic of said feed fluid and said concentrate fluid in said stages;
said fluid treatment line further comprising a controller responsive to said detector for controlling said at least one pump to effectively match a characteristic of said feed fluid and said concentrate fluid in said stages.

2. The fluid treatment line of claim 1, wherein the interconnections produce said flow of receiving fluid along a direction counter to said feed flow effective to enhance conductivity matching of said feed flow and said concentrate flow in the treatment units along the treatment line, thereby assuring stable electrical operating conditions in said units.

3. The fluid treatment line of claim 1, wherein the interconnections produce a counterflow of receiving fluid effective to enhance removal of a component from or back-diffusion of a component into the feed fluid.

4. The fluid treatment line of claim 1, wherein the interconnections produce a counterflow of receiving fluid effective to inhibit diffusive loss of a component from the feed fluid through membranes of the treatment units.

5. The fluid treatment line of claim 1, wherein the treatment units include EDI units.

6. A process of for treating a biological feed stream using the fluid treatment line of claim 5, such process including the steps of treating the feed to remove components thereof by passing the feed fluid through said EDI units wherein said EDI units include a stage of filled-cell EDI units, and the process is carried out to remove first components of the feed by normal operation of at least one of said EDI units to transfer the first components into a concentrate stream while capturing second components in or on exchange resin, and release or backflush second components during a reversal or cleaning mode of operation of said at least one EDI unit.

7. The process of claim 6, wherein an EDI unit has cells with a first exchange resin packing at an upstream end of the cells and a second resin packing at a downstream portion of the cells the first and second packings being different, and the first packing conditioning flow ahead of the second packing by defouling, acidifying or the like.

8. The process of claim 6, wherein the process is performed by means of a thick cell store and release EDI reversal unit.

9. The fluid treatment line of claim 1, wherein the treatment units include ED units.

10. The fluid treatment line of claim 1, wherein the treatment units include one or more ED units and one or more EDI units.

11. The fluid treatment line of claim 10, wherein at least some of said ED units are in a different stage than at least some of said EDI units, and are located upstream of said EDI units in the treatment line.

12. The fluid treatment line of claim 1, wherein the treatment units are arranged in plural electrical stages that are impressed with different potentials effective to simultaneously enhance quality and flow of said feed fluid along the treatment line.

13. The fluid treatment line of claim 1, wherein the interconnections include one or more valves operable to control flow to effect reversal operation of at least some of the units.

14. The fluid treatment line of claim 1, 9 or 13, wherein the interconnections include a common feed conduit and at least one pump operable to circulate feed fluid from the common feed conduit to a stage and back to the conduit as the feed fluids moves along the treatment line.

15. The fluid treatment line of claim 13, wherein said controller is operative to effect a phased interchange of fluid connections between said units and a feed line during reversal operation of at least some of said units so as to increase product recovery while maintaining product quality.

16. The fluid treatment line of claim 1, 13 or 15, wherein the controller effects cleaning of cells during a reversal phase to flush accumulated material from said units.

17. The fluid treatment line of claim 16, wherein said cleaning includes a concentrated salt cleaning effective to remove biofoulant from resin surfaces in said units.

18. The fluid treatment line of claim 1 or 12, wherein the interconnections include at least one pump operable to circulate concentrate fluid from a common conduit through a unit of a stage and back to the conduit as the concentrate flow proceeds in a counter direction along the treatment line.

19. The fluid treatment line of claim 1, wherein the treatment line includes at least one sensor operative to detect quality of the feed flow, and said controller operative to control a valve or pump in response thereto.

20. The fluid treatment line of claim 1 or 19, further comprising a detector operative to sense a characteristic of the concentrate, and said controller responsive thereto for controlling operation of the treatment line.

21. The fluid treatment line of claim 1, comprising a common concentrate line and at least some of said units are reversal units, said interconnections including a plurality of reversal valves operable to interchange dilute and concentrate flows of the reversal units, and wherein said controller operates to selectively effect reversal operation of a unit to carry out a cleaning regimen that backflushes accumulated foulants from cells of the unit, e.g., to the common concentrate line.

22. The fluid treatment line of claim 21, wherein the cleaning regimen operates with a salt solution above 1.0 N to clean surfaces and restore flow through cells of the unit.

23. The fluid treatment line of claim 21, wherein the cleaning regimen includes a step of recirculating salt solution through the unit during hydraulic reversal, optionally at one or more extremes of pH.

24. The fluid treatment line of claim 21, wherein the cleaning regimen includes a step of recirculating fluid during reversal to break up and remove surface film, and flushing the removed film to the common concentrate line or to waste.

25. The treatment system of claim 1, wherein the characteristic includes one or more of the characteristics of electrical conductance or resistance, fluid pressure and concentration of a fluid component.

26. A treatment system comprising a plurality of electrodialysis units arranged in stages to each receive a feed flow to be treated and a concentrate flow, wherein at least one stage includes one or more filled-cell electrodialysis (EDI) units, and said feed flow proceeds through the stages in an order opposite to that of the concentrate flow;

said fluid treatment system further comprising at least one pump operative to control the progress of said feed flow and said concentrate flow through said units, said stages further comprising a detector operative to sense a characteristic of said feed flow and said concentrate flow in said units;

said fluid treatment system further comprising a controller responsive to said detector for controlling said at least one pump to effectively match a characteristic of said feed flow and said concentrate flow in said units.

27. The treatment system of claim 26, wherein the characteristic includes one or more of the characteristics of electrical conductance or resistance, fluid pressure and concentration of a fluid component.

* * * * *

UNITED STATES PATENT AND TRADEMARK OFFICE
CERTIFICATE OF CORRECTION

| | | |
|---|---|---|
| PATENT NO. | : 8,142,633 B2 | Page 1 of 1 |
| APPLICATION NO. | : 10/577120 | |
| DATED | : March 27, 2012 | |
| INVENTOR(S) | : Bruce Batchelder, Li Zhang and William W. Carson | |

It is certified that error appears in the above-identified patent and that said Letters Patent is hereby corrected as shown below:

Column 22, Line 13-14, Claim 6, please delete the first occurrence of the word "of" from the sentence, "A process of for treating a biological feed stream using the fluid treatment line of claim 5, ..." to read as, "A process for treating a biological feed stream using the fluid treatment line of claim 5, ..."

Signed and Sealed this
Tenth Day of July, 2012

David J. Kappos
*Director of the United States Patent and Trademark Office*